Oct. 27, 1925.
F. J. HERMANN
1,558,873
INTERNAL COMBUSTION ENGINE
Filed Feb. 6, 1925
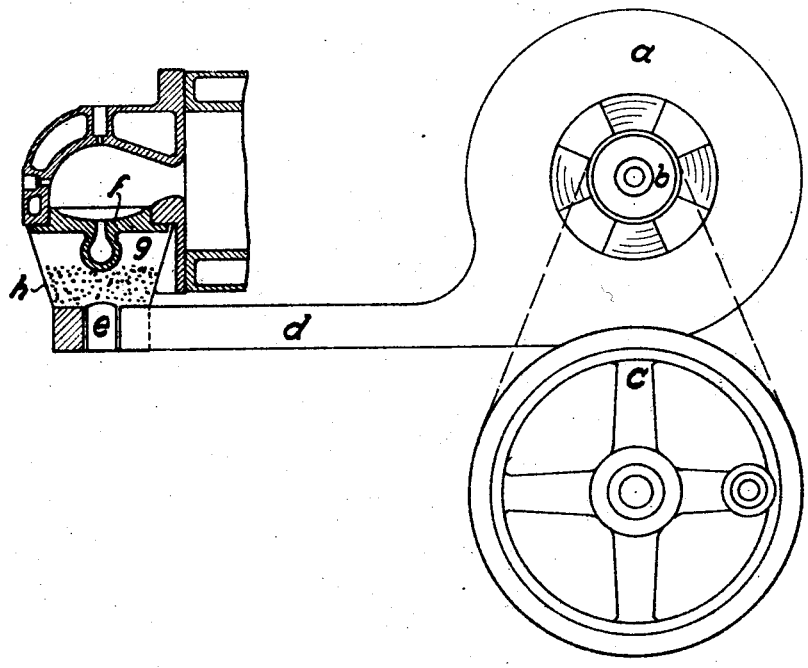
Witnesses:
Inventor:
Franz Josef Hermann,
by his Attorney.

Patented Oct. 27, 1925.

1,558,873

UNITED STATES PATENT OFFICE.

FRANZ JOSEF HERMANN, OF SINGEN-HOHENTWIEL, BADEN, GERMANY, ASSIGNOR TO FIRM OF HEINRICH LANZ, OF MANNHEIM, GERMANY.

INTERNAL-COMBUSTION ENGINE.

Application filed February 6, 1925. Serial No. 7,425.

*To all whom it may concern:*

Be it known that I, FRANZ JOSEF HERMANN, a citizen of the German Republic, residing at Singen-Hohentwiel, State of Baden, German Republic, have invented certain new and useful Improvements in Internal-Combustion Engines, of which the following is a specification.

This invention relates to internal combustion engines of the kind in which the ignition is effected by means of incandescent heads that need to be brought to a state of incandescence by the application of heat in order to start the engine.

The object of the invention is to provide simple and efficient means whereby the incandescent heads of such engines can be readily heated to the desired temperature.

It has been heretofore usual to use for this purpose a soldering or the like heating lamp which is first heated with benzine and then driven with spirit in order to heat up the head to the desired temperature. The disadvantages attending the use of this type of heating lamp, particularly its inflammability which is a frequent cause of accidents, are well known.

According to the present invention all the drawbacks common to heating lamps are obviated and further, in contradistinction to heating lamps, the improved heating means render it possible to maintain the incandescent head warm during working pauses of the engine so that after a pause the engine can be again started quickly.

The invention is based upon the use of solid, non liquid fuels, such for instance as charcoal or the like, which are ignited in a container suitably associated with the incandescent head and raised by means of a current of compressed air to a high temperature which is imparted to the incandescent head so that it becomes hot in a short space of time.

The accompanying drawing shows in sectional elevation a constructional form of apparatus embodying the invention.

The apparatus comprises a blower $a$ the driving wheel $b$ of which is driven by a belt or chain from a large wheel $c$ furnished with a handle or the like. The air sucked in is forced by the blower $a$ through the pipe $d$ and the nozzle $e$ into a container $g$, which partly surrounds the incandescent head $f$ in which charcoal or a similar solid fuel is indicated at $h$.

For starting up the engine the casing $g$ is charged with a small quantity of charcoal, which is ignited and is quickly consumed, whilst throwing off a high temperature, by the current of air coming from the blower $a$, so that the incandescent head acquires the desired heat in a very short time.

In order to maintain the head hot during working pauses the container $g$ is charged with charcoal which is ignited through the hot incandescent head and burns for a long time so that the incandescent head, which has previously not cooled off very much, is again ready for action in a very short time.

The blower $a$ is of any appropriate construction suitable for the purpose.

What I claim is:—

1. In an internal combustion engine, an incandescent head, a receptacle associated with said head and adapted to receive solid fuel the burning of which will heat said head, and means for delivering a current of air to said container to support the combustion of the fuel therein.

2. In an internal combustion engine, an incandescent head, a receptacle associated with said head and adapted to receive solid fuel the burning of which will heat said head, and hand driven means for delivering a current of air to said container to support the combustion of the fuel therein.

3. In an internal combustion engine, an incandescent head, a receptacle associated with said head and adapted to receive solid fuel the burning of which will heat said head, and a blower for delivering a current of air to said container to support the combustion of the fuel therein.

4. In an internal combustion engine, an incandescent head, a receptacle associated with said head and adapted to receive solid fuel the burning of which will heat said head, a rotary blower for delivering a current of air to said container to support the combustion of the fuel therein, a rotary handwheel, and driving means whereby said blower is driven by said handwheel.

5. In an internal combustion engine, an incandescent head, a receptacle associated with said head and adapted to receive solid fuel the burning of which will heat said head, a container having a nozzle arranged to deliver a current of air into the fuel within said container, and a blower having an air delivery conduit connected to the air nozzle of said container.

6. In an internal combustion engine, an incandescent head, a receptacle associated with said head and adapted to receive solid fuel the burning of which will heat said head, a container having a nozzle arranged to deliver a current of air into the fuel within said container, and a hand driven blower having an air delivery conduit connected to the air nozzle of said container.

In testimony whereof I affix my signature.

FRANZ JOSEF HERMANN.